(12) United States Patent
Ziegler et al.

(10) Patent No.: US 7,578,941 B2
(45) Date of Patent: Aug. 25, 2009

(54) LENGTH-BASED LIQUID-LIQUID EXTRACTION OF CARBON NANOTUBES USING A PHASE TRANSFER CATALYST

(75) Inventors: Kirk J. Ziegler, Gainesville, FL (US); Daniel J. Schmidt, Troy, MI (US); Robert H. Hauge, Houston, TX (US); Richard E. Smalley, Houston, TX (US); Irene Morin Marek, legal representative, Houston, TX (US)

(73) Assignee: William Marsh Rice University, Houston, TX (US)

( * ) Notice: Subject to any disclaimer, the term of this patent is extended or adjusted under 35 U.S.C. 154(b) by 617 days.

(21) Appl. No.: 11/289,000

(22) Filed: Nov. 29, 2005

(65) Prior Publication Data
US 2006/0201880 A1    Sep. 14, 2006

Related U.S. Application Data

(60) Provisional application No. 60/631,643, filed on Nov. 30, 2004.

(51) Int. Cl.
*B01D 11/02* (2006.01)
(52) U.S. Cl. ............ 210/639; 210/708; 210/737; 210/738; 210/774; 210/787; 210/806; 209/1; 423/460; 423/461; 204/450; 977/750; 977/845; 977/847
(58) Field of Classification Search ........... 210/634, 210/638, 639, 644, 708, 737, 738, 774, 804, 210/806; 209/1, 11, 155; 423/445 B, 460, 423/461, 447.1; 977/742, 746, 750, 751, 977/842, 845, 847, 745; 204/450, 451, 600, 204/601
See application file for complete search history.

(56) References Cited

U.S. PATENT DOCUMENTS 5,374,415 A    12/1994  Alig et al.
6,331,262 B1 *  12/2001  Haddon et al. ............. 252/502

(Continued)

FOREIGN PATENT DOCUMENTS

| WO | WO 02/060812 | | 8/2002 |
| WO | WO 2004/082794 | * | 9/2004 |
| WO | WO 2005/085132 | | 9/2005 |

OTHER PUBLICATIONS

Iijima, "Helical microtubules of graphitic carbon", 354 Nature (1991), pp. 56-58.

(Continued)

*Primary Examiner*—Joseph W Drodge
(74) *Attorney, Agent, or Firm*—Winstead PC

(57) ABSTRACT

The present invention is generally directed to new liquid-liquid extraction methods for the length-based separation of carbon nanotubes (CNTs) and other 1-dimensional nanostructures. In some embodiments, such methods are directed to separating SWNTs on the basis of their length, wherein such methods comprise the steps of: (a) functionalizing SWNTs to form functionalized SWNTs with ionizable functional moieties; (b) dissolving said functionalized SWNTs in a polar solvent to form a polar phase; (c) dissolving a substoichiometric (relative to the amount of ionizable functional moieties present on the SWNTs) amount of a phase transfer agent in a non-polar solvent to form a non-polar phase; (d) combining the polar and non-polar phases to form a bi-phase mixture; (e) adding a cationic donor species to the bi-phase mixture; and (f) agitating the bi-phase mixture to effect the preferential transport of short SWNTs into the non-polar phase such that the non-polar phase is enriched in short SWNTs and the polar phase is enriched in longer SWNTs. In other embodiments, analogous methods are used for the length-based separation of any type of CNT, and more generally, for any type of 1-dimensional nanostructure.

24 Claims, 3 Drawing Sheets

U.S. PATENT DOCUMENTS

| | | | | |
|---|---|---|---|---|
| 7,074,310 | B2* | 7/2006 | Smalley et al. | 204/450 |
| 7,374,649 | B2* | 5/2008 | Jagota et al. | 204/456 |
| 7,374,685 | B2* | 5/2008 | Sun | 210/639 |
| 2003/0168385 | A1* | 9/2003 | Papadimitrakopoulos | 209/1 |
| 2005/0136638 | A1* | 6/2005 | Voss-Kehl et al. | 438/610 |
| 2006/0115640 | A1* | 6/2006 | Yodh et al. | 428/221 |
| 2008/0063587 | A1* | 3/2008 | Strano et al. | 423/447.1 |

OTHER PUBLICATIONS

Iijima et al., "Single-shell carbon nanotubes of 1-nm diameter", 363 Nature (1993), pp. 603-605.

Bethune et al., "Cobalt-catalysed growth of carbon nanotubes with single-atomic-layer walls", 363 Nature (1993), pp. 605-607.

Baughman et al., "Carbon Nanotubes—the Route Toward Applications", 297 Science (2002), pp. 787-792.

Ebbesen, "Carbon Nanotubes", 24 Annu. Rev. Mater. Sci. (1994), pp. 235-264.

Thess et al., "Crystalline Ropes of Metallic Carbon Nanotubes", 273 Science (1996), pp. 483-487.

Vander Wal et al., "Flame synthesis of Fe catalyzed single-walled carbon nanotubes and Ni catalyzed nanofibers . . . " 349 Chem. Phys. Lett. (2001), pp. 178-184.

Hafner et al., "Catalytic growth of single-wall carbon nanotubes from metal particles", 296 Chem. Phys. Lett. (1998), pp. 195-202.

Cheng et al., Bulk morphology and diameter distribution of single-walled carbon nanotubes . . . , 289 Chem. Phys. Lett. (1998), pp. 602-610.

Nikolaev et al., "Gas-phase catayltic growth of single-walled carbon nanotubes from carbon monoxide", 313 Chem. Phys. Lett. (1999), pp. 91-97.

Strano et al., "The Role of Surfactant Adsorption during Ultrasonication in the Dispersion of Single-Walled carbon nanotubes", 3 J. Nanosci. and Nanotech. (2003), pp. 81-86.

O'Connell et al. "Reversible water-solubilization of single-walled carbon nanotubes by polymer wrapping", 342 Chem. Phys. Lett. (2001), pp. 265-271.

Liu et al., "Fullerene Pipes", 280 Science (1998), pp. 1253-1256.

Chen et al., "Solution Properties of Single-Walled Carbon Nanotubes", 282 Science (1998), pp. 95-98.

Khabashesku et al., "Fluorination of Single-Walled Carbon Nanotubes and Subsequent Derivatization Reactions", 35 Acc. Chem. Res. (2002), pp. 1087-1095.

Holzinger et al., "Sidewall Functionalization of Carbon Nanotubes", 40 Angew. Chem. Int. Ed. (2001), pp. 4002-4005.

Ying et al., "Functionalization of Carbon Nanotubes by Free Radicals" 5 Org. Letters 9 (2003), pp. 1471-1473.

Bahr et al., "Functionalization of Carbon nanotubes by Electrochemical reduction of Aryl Diazonium Salts: A Bucky Paper Electrode" 123 J. Am. Chem. Soc. (2001), pp. 6536-6542.

Kamaras et al., "Covalent Bond Formation to a Carbon Nanotube Metal", 301 Science (2003), p. 1501.

Gu et al., "Cutting Single-Wall Carbon nanotubes through Fluorination", 2 Nano Lett. 9 (2002), pp. 1009-1013.

Ziegler et al., "Controlled Oxidative Cutting of Single-Walled Carbon Nanotubes", 127 J. Am. Chem. Soc. (2005), pp. 1541-1547.

Heller et al., "Concomitant Length and Diameter Separation of Single-Walled Carbon Nanotubes", 126 J. Am Chem. Soc. (2004), pp. 14567-14573.

Hudson et al., "Water-Soluble, Exfoliated, Nonroping Single-Wall Carbon Nanotubes", 126 J. Am. Chem. Soc. (2004), pp. 11158-11159.

Ziegler et al., "Length-Dependent Extraction of Single-Walled Carbon Nanotubes," Nano Lett. (in press), DOI: 10.1021/nl0510208, (2005), pp. 2355-2359.

\* cited by examiner

LENGTH-BASED LIQUID-LIQUID EXTRACTION OF CARBON NANOTUBES USING A PHASE TRANSFER CATALYST

CROSS-REFERENCE TO RELATED APPLICATIONS

The present Application for Patent claims priority to U.S. Provisional Patent Application Ser. No. 60/631,643, filed Nov. 30, 2004.

The present invention was made with support from the Defense Advanced Research Projects Agency (DARPA), under contract number N00014-04-1-0765.

FIELD OF THE INVENTION

This invention relates generally to carbon nanotubes, and specifically to methods for separating carbon nanotubes on the basis of their length.

BACKGROUND

Carbon nanotubes (CNTs), comprising multiple concentric shells and termed multi-wall carbon nanotubes (MWNTs), were discovered by Iijima in 1991 [Iijima, *Nature* 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., *Nature* 1993, 363, 603-605; and Bethune et al., *Nature* 1993, 363, 605-607]. These carbon nanotubes (especially SWNTs) possess unique mechanical, electrical, thermal and optical properties, and such properties make them attractive for a wide variety of applications. See Baughman et al., *Science*, 2002, 297, 787-792.

Methods of making CNTs include the following techniques: arc discharge [Ebbesen, *Annu. Rev. Mater. Sci.* 1994, 24, 235-264]; laser oven [Thess et al., *Science* 1996, 273, 483-487]; flame synthesis [Vander Wal et al., *Chem. Phys. Lett.* 2001, 349, 178-184]; and chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used.

Techniques of suspending and chemically functionalizing CNTs have greatly facilitated the ability to manipulate these materials, particularly for SWNTs which tend to assemble into rope-like aggregates [Thess et al., *Science*, 1996, 273, 483-487]. Such suspending techniques typically involve dispersal of CNTs with surfactant and/or polymer material [see Strano et al., *J. Nanosci. and Nanotech.*, 2003, 3, 81; O'Connell et al. *Chem. Phys. Lett.*, 2001, 342, 265-271]. Such chemical functionalization of CNTs is generally divided into two types: tube end functionalization [see, e.g., Liu et al., *Science*, 1998, 280, 1253-1256; Chen et al., *Science*, 1998, 282, 95-98], and sidewall functionalization [see, e.g., PCT publication WO 02/060812 by Tour et al.; Khabashesku et al., *Acc. Chem. Res.*, 2002, 35, 1087-1095; and Holzinger et al., *Angew. Chem. Int. Ed.*, 2001, 40, 4002-4005], and can serve to facilitate the debundling and dissolution of such CNTs in various solvents. Scalable chemical strategies have been, and are being, developed to scale up such chemical manipulation [Ying et al., *Org. Letters*, 2003, 5, 1471-1473; Bahr et al., *J. Am. Chem. Soc.*, 2001, 123, 6536-6542; and Kamaras et al., *Science*, 2003, 301, 1501].

SWNTs are typically synthesized with polydisperse micrometer lengths where they are bound into microscopic entangled ropes. Many applications, however, will require short undamaged individual nanotubes 20-100 nm in length. For example, the introduction of SWNTs into electronic devices will clearly require the ability to place SWNTs of a specific band gap and precise length in a well-defined location on a substrate. Techniques have been developed for cutting SWNTs into shorter segments. See, e.g., Gu et al., *Nano Lett.* 2002, 2, 1009-1013; and Ziegler et al., *J. Am. Chem. Soc.* 2005, 127, 1541-1547. However, while these processes yield SWNTs of shorter length, they often still have significant polydispersity. Hithertofore, length-based separations of SWNTs have been limited to small-scale techniques such as chromatography and electrophoresis [Heller et al., *J. Am Chem. Soc.*, 2004, 126, 14567-14573].

In view of the foregoing, a simpler, more scalable method of length separation would be extremely useful.

BRIEF DESCRIPTION OF THE INVENTION

The present invention is generally directed to new liquid-liquid extraction processes for the length-based separation of carbon nanotubes (CNTs) and other 1-dimensional nanostructures.

In some embodiments, the present invention is directed to methods for separating SWNTs on the basis of their length, said methods comprising the steps of: (a) functionalizing SWNTs to form functionalized SWNTs with ionizable functional moieties; (b) dissolving said functionalized SWNTs in a polar solvent to form a polar phase; (c) dissolving a substoichiometric (relative to the amount of ionizable functional moieties present on the SWNTs) amount of a phase transfer agent in a non-polar solvent to form a non-polar phase; (d) combining the polar and non-polar phases to form a bi-phase mixture; (e) adding a cationic donor species to the bi-phase mixture; and (f) agitating the bi-phase mixture to effect the preferential transport of short SWNTs into the non-polar phase such that the non-polar phase is enriched in short SWNTs and the polar phase is enriched in longer SWNTs. In other embodiments, analogous methods are used for the length-based separation of any type of CNT, and more generally, for any type of 1-dimensional nanostructure.

It is important to point out that in any of the embodiments described herein, the terms "long" or "longer" and "short" or "shorter," as they relate to CNTs and other 1-dimensional nanostructures, are relative terms reflective of a material initially having a polydispersity of lengths that is subjected to length-based separation. Upon being subjected to such a length-based separation, the CNTs in one phase will be, on average, longer than the CNTs in the other phase.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
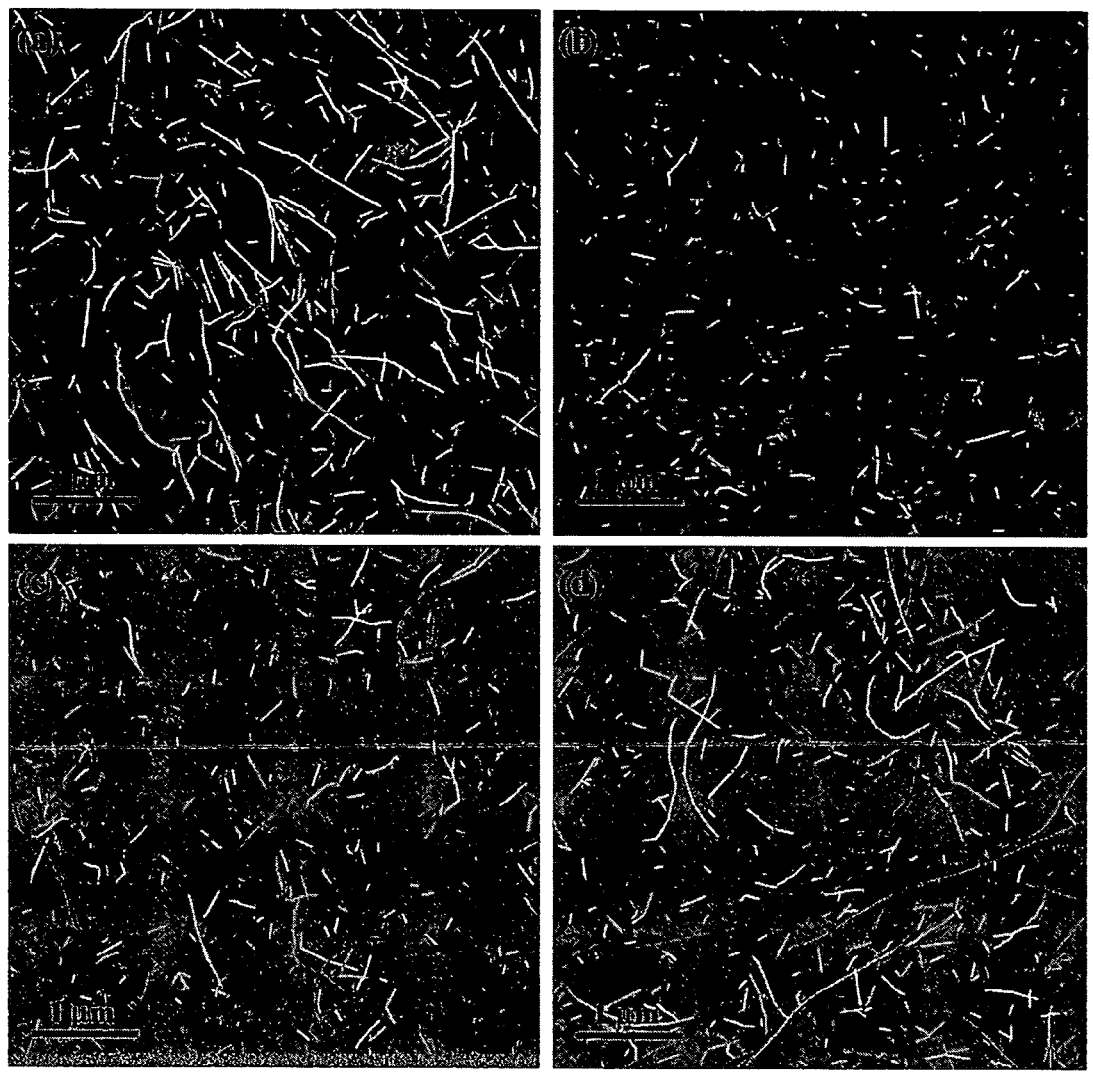
FIGS. 1$a$-1$d$ are AFM images of the functionalized SWNTs (a) before extraction; and after partial extraction with TOAB corresponding to ion-pairing of (b) 30%, (c) 60%, and (d) 75%.

This invention is directed to new liquid-liquid extraction processes for the length-based separation of carbon nanotubes and other 1-dimensional nanostructures. Generally, such processes are easily scalable and overcome many of the limitations seen in the prior art. Furthermore, the separated carbon nanotubes are easily collected and purified to a pristine state.

Carbon nanotubes (CNTs), as defined herein, include multi-wall carbon nanotubes (MWNTs), single-wall carbon nanotubes (SWNTs), small-diameter (<3 nm) carbon nanotubes, double-wall carbon nanotubes, and combinations thereof. The CNTs can be made by any known method and can be subjected to one or more processing techniques prior to being subjected to the methods of the present invention.

While inclusive of CNTs, 1-dimensional nanostructures, as defined herein, generally refer to structures that are nano-sized (1-100 nm) in at least two dimensions. Such structures include, but are not limited to, nanotubes, nanorods, and nanowires.

In some embodiments, pristine SWNTs are first functionalized with an ionizable moiety such as chlorobenzenesulfonic acid groups. See, e.g., Hudson et al., *J. Am. Chem. Soc.*, 2004, 126, 11158-11159. These functionalized tubes have high solubility in water (0.20 mg/mL) and other polar solvents (e.g., methanol, ethanol). The nanotubes are dissolved in water and placed in an extraction vessel. Then, a solution of tetraoctylammonium bromide (TOAB), a common phase transfer catalyst (agent), is prepared in an organic solvent (e.g., ethyl acetate or toluene). This solution is added to the extraction vessel resulting in a liquid-liquid phase system. The extraction vessel is shaken vigorously to increase interfacial area and assist transfer across the interface. The resultant mixture is filled with gray emulsions. When ethyl acetate is used as the organic solvent, the emulsions are very fine with the swollen water phase occupying almost the entire liquid volume. The emulsions settle slowly (over ~2 hours) still giving a water phase swollen with emulsions. The extraction vessel is then placed in a freezer overnight and then allowed to thaw. Upon gentle agitation, the presence of carbon nanotubes is evident in the upper phase. When toluene is used as the organic solvent, the emulsions are coarser than for ethyl acetate, and settle more quickly (~5 seconds) giving a swollen, emulsion-filled water phase. Complete extraction of the nanotubes is achieved when a molar excess of TOAB is utilized. Under TOAB-starved conditions (i.e., a molar ratio less than 1 of TOAB to chlorobenzenesulfonic acid groups), Applicants find that the shortest nanotubes in the sample are being extracted. Applicants have varied the TOAB concentration and found that the length of SWNTs transferred from the water to the organic phase is indeed dependent on TOAB concentration.

The extraction of SWNTs from the water phase to the organic phase is also reversible. After the extraction, the SWNTs are complexed with $TOA^+$ cations and $NH_4^+$ cations in the organic phase. These cationic ligands can be de-complexed with the addition of excess acetic acid. In the presence of excess acetic acid, the $TOA^+$ will preferentially bind to the acetate anions. The mixture is then filtered, the solids are placed in water, methanol, or ethanol and sonicated for ~1 minute to obtain re-suspension in the polar solvent.

While not intending to be bound by theory, the proposed mechanism of phase transfer is due to the $TOA^+$ coupling with the sulfonate anion via a one-to-one electrostatic interaction. Under TOAB excess, the presence of TOAB on the SWNTs provides the nanotubes with sufficient organophilic nature to transfer them to the organic phase. However, at intermediate concentrations, where the $TOA^+$ does not couple with every sulfonate anion, the presence of the remaining negative charges will preclude phase transfer of SWNTs. Therefore, salts such as ammonium chloride are required to charge neutralize the remaining sulfonate anions. These salts should be chosen to effectively neutralize the surface without increased organophilicity. In the TOAB-starved conditions, where the sulfonate groups on the SWNTs are partially complexed with $TOA^+$ cations and partially complexed with $NH_4^+$ cations, length selective extraction occurs. This length-based extraction can be understood in terms of the attractive interactions between colloidal particles and the steric repulsion interactions that occur with a brush layer attached to the colloids. Pair-wise summation of the van der Waals attractions results in significantly larger interactions for larger colloidal particles. In Applicants' system, the attractive forces of the rigid rods scale with the length of the nanotube. Therefore, the longer nanotubes have greater van der Waals interactions than shorter nanotubes. Under poor solvent conditions, or in the case of poor (hindered) ion-pairing of the organophilic $TOA^+$, there will be poor ligand-solvent interactions leading to reduced steric forces. Thus, longer nanotubes will aggregate, excluding them from the organic phase. However, the smaller nanotubes will have sufficient steric interactions from the $TOA^+$ to render them soluble in the organic layer.

As described above, the availability of SWNT samples of uniform length is essential to many specialized applications. One such application is molecular electronics, in which a nanotube of a very specific length may be needed as a wire to make an electrical connection. Similar electronic applications involve the use of nanotubes as field emission devices and in applications utilizing their semiconducting abilities. Length specific SWNTs are also essential for biological applications such as imaging and sensing. Nanotubes of specific, small lengths are likely to be necessary to penetrate cells and to serve as biological markers. Yet another application requiring SWNTs of specific length is scanning probe microscopy where they are used as scanning probe tips.

In addition to the above-described applications, the isolation of the shortest tubes in a sample is particularly useful for another commonly-assigned technology: the SWNT amplifier. See Smalley et al., "Amplification of Single Wall Carbon Nanotubes," PCT Patent Application Serial No. US04/34002, filed Oct. 14, 2004. The amplifier will grow long SWNTs from shorter SWNTs in the gas phase. Successful implementation of this technology requires a high solubility of SWNTs in a carrier solvent. As pointed out above, this will clearly be dependent on the length of the SWNT. Therefore, the amplifier will give the highest yield when short nanotubes (e.g., 10-60 nm in length) are fed to the reactor, thereby requiring their separation from the longer nanotubes prior to injection into the reactor.

The present invention provides the first easily scalable length-based extraction procedure for carbon nanotubes. Existing techniques are done on either an analytical or preparative scale, such as size exclusion chromatography, high performance liquid chromatography, ion exchange chromatography, capillary electrophoresis, and field flow fractionation. As Applicants' technique is a liquid-liquid extraction procedure, it can be applied on an industrial scale. In addition, Applicants' procedure can handle concentrated nanotubes in water (0.20 mg/mL) without the presence of any surfactants. Existing methods use SWNTs suspended in water with the aid of surfactants such as sodium dodecyl sulfate (SDS) and Triton X-100, further complicating separation by the need to separate the surfactants from the SWNTs. Yet another novel feature of the herein described extraction processes is their reversibility. The SWNTs complexed with $TOA^+$ cations and $NH_4^+$ cations in the organic phase can be resuspended in a polar solvent by de-complexing the attached ligands with an excess of acetic acid.

The initial formation of stable emulsions, upon mixing of the organic and aqueous layers, is crucial in the generation of enough surface area to elicit phase transfer. However the persistence of these emulsions can make biphasic separation difficult. Applicants have found freezing overnight and thawing to be relatively effective at breaking these emulsions.

A variation (i.e., alternate embodiment) on the above-described process is the use of SWNTs (or other CNTs) functionalized with carboxylic acid-containing functional groups rather than sulfonate functional groups. Assuming these SWNTs are soluble in water, the above-described extraction procedure could easily be carried out since $TOA^+$ is known to readily complex with carboxylate anions. In fact, the use of the carboxylic acid-containing SWNTs has potential advantages over the sulfonate groups. The carboxylic acids are much less acidic than sulfonic acid, meaning that the level of protonation of the carboxyl groups can easily be controlled with pH. In one sense, protonation can be used to reverse the phase transfer or to alter the needed concentrations of TOAB to elicit phase transfer. Additionally, with fewer negatively charged ions on the SWNT surfaces, there should theoretically be fewer problems with emulsion formation as is seen in the above-described cases with sulfonate-modified tubes. Other functional groups that contain anions are also plausible variations.

The extraction process is capable of many variations. There are a wide range of phase transfer catalysts such as quaternary onium salts, crown ethers, etc. These catalysts can be asymmetric or symmetric. The counter anion used can also be varied. In addition, the salt (cationic donor species) added to the aqueous phase used to passivate the remaining charges on the nanotube can be varied and may even include the use of less organophilic phase transfer catalysts to assist the transfer of the SWNTs to the organic phase. The organic phase can be exchanged for virtually any solvent that has at least limited solubility of the phase transfer catalyst and results in extraction of the nanotubes. In fact, any two phase system may be utilized for the extraction of the SWNTs where the use of a phase transfer catalyst is utilized in transferring the SWNTs from one phase to another. Any number of common methods utilized to reduce emulsion formation or stability such as deemulsifiers or centrifugation may also be utilized in addition to, or in lieu of, freezing.

As mentioned previously, it is important to emphasize that while the discussion herein has been directed to SWNTs, such length-based methods of separating can generally be applied to any type of 1-dimensional structures-to the extent that they can be sufficiently functionalized with ionizable moieties.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

This Example serves to illustrate a typical extraction procedure in accordance with some embodiments of the present invention.

Approximately 100 mg of SWNTs were sidewall functionalized with chlorobenzenesulfonic acid groups according to a published procedure (Hudson et al., *J. Am. Chem. Soc.* 2004, 126, (36), 11158-11159). These functionalized SWNTs were then dissolved in nanopure water (0.04 mg/mL) and a 5 mL aliquot of this solution is placed in a scintillation vial 1. Next, TOAB was dissolved in ethyl acetate or toluene to achieve a concentration $2-4 \times 10^{-5}$ M (in a molar ratio less than 1 with respect to chlorobenzenesulfonic acid groups) and a 5 mL aliquot was added to scintillation vial 1. Note that the concentration of TOAB chosen will determine the number of fractions obtained from the extraction. A 50 µL aliquot of $NH_4Cl$ solution (10× molar excess with respect to the chlorobenzenesulfonic acid groups) was then added to vial 1. The vial was then shaken vigorously by hand for 30 seconds. After shaking, the vial was placed in a freezer overnight. The following day, it was thawed and swirled gently. The organic layer (enriched in short SWNTs) was collected in another scintiallation vial 2 and mixed with an excess of acetic acid (e.g., 2×v/v). The contents of this vial were swirled vigorously for ~20 seconds. The organic layer was then filtered through a 0.2 µm Teflon filter. The solid residue (short SWNTs) was collected and placed in a scintillation vial 3 with a polar solvent. This scintillation vial was sonicated for ~1 minute to obtain a good suspension. Another 5 mL aliquot of TOAB in ethyl acetate or toluene of the same concentration chosen above was added to scintillation vial 1 and the extraction steps were repeated to obtain the next fraction. This process can be repeated until all SWNTs are extracted from vial 1, which occurs once a 1:1 molar ratio of TOAB: sulfonate groups is achieved.

EXAMPLE 2

This Example serves to illustrate how atomic force microscopy (AFM) can be used to evaluate the lengths of SWNTs that have been subjected to length-based separation methods of the present invention. Such methods are further illustrated in Ziegler et al., "Length-Dependent Extraction of Single-Walled Carbon Nanotubes," Nano Lett. (in press), DOI: 10.1021/n10510208.

Figure 2:
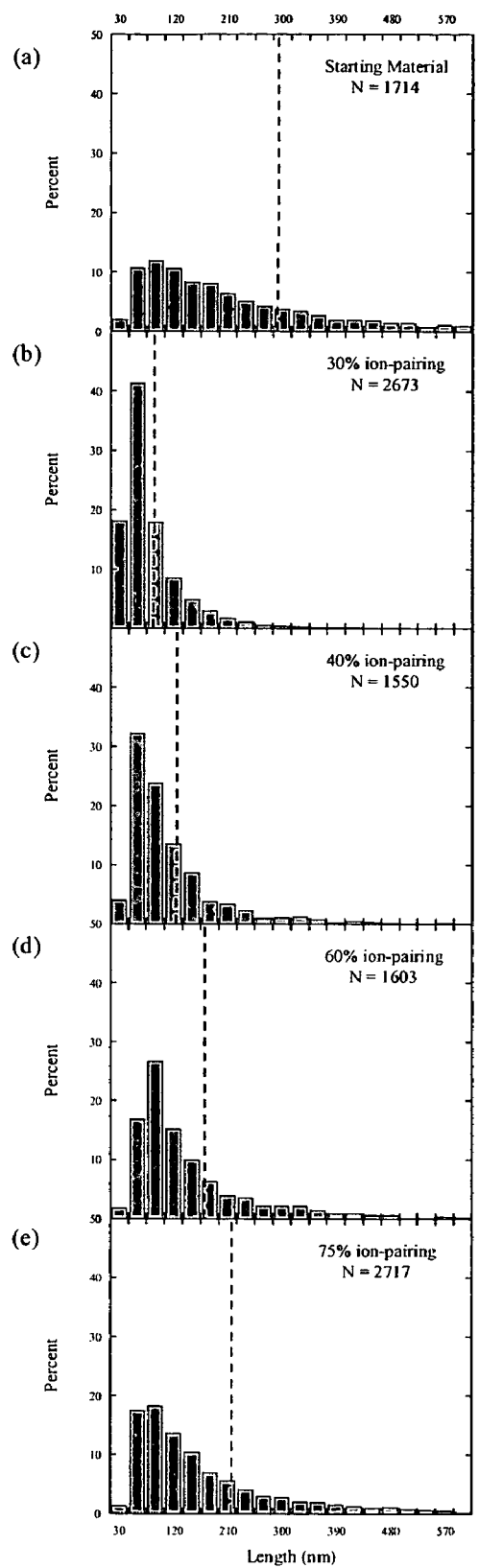
FIGS. 2a-2e depict length distributions of the functionalized SWNTs (a) before extraction; and after partial extraction with TOAB corresponding to ion-pairing of (b) 30%, (c) 40%, (d) 60%, and (e) 75%. The dashed lines indicate the average length of the sample.
Figure 3:
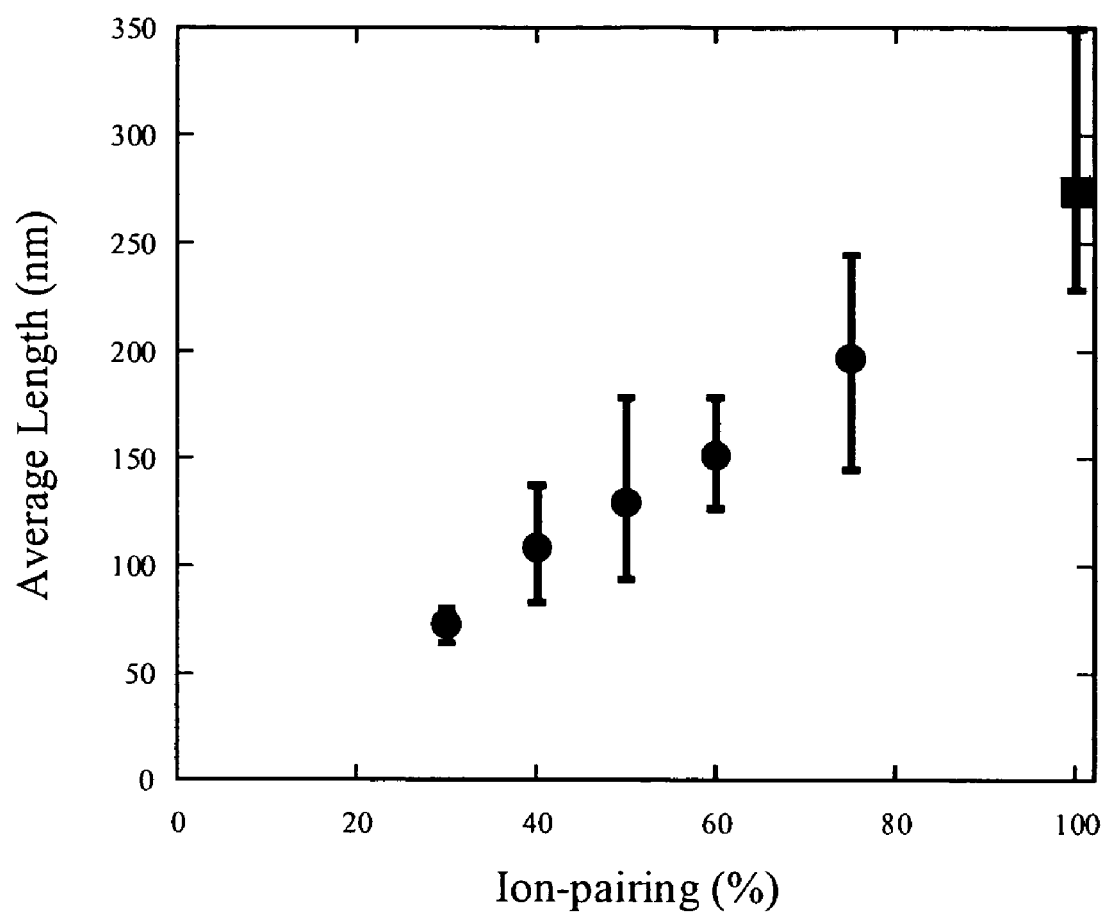
FIG. 3 is a plot of average length of the nanotubes extracted as a function of ion-pairing (circles). The starting material is shown on the plot at 100% (square) to demonstrate that the lengths extracted approaches complete extraction.

For length measurements of SWNTs extracted into a nonpolar organic layer, the organic phase was collected, washed with acetic acid, and re-suspended in methanol after ultrasonication for ~1 min. The extracted nanotube solutions were then spin-coated onto freshly cleaved mica substrates yielding a high quantity of individual nanotubes. FIG. 1 shows tapping mode AFM images (Digital Instruments Nanoscope IIIA) and FIG. 2 shows the length distributions obtained using SIMAGIS software for the starting material and for extractions at stoichiometric ratios (TOAB: $SO_3^-$) of 0.3, 0.4, 0.6 and 0.75. Only individual nanotubes were utilized for length measurements. Typically, over 1500 nanotubes were measured to obtain statistically meaningful results. The starting material (FIG. 1*a* and FIG. 2*a*) has a broad distribution of nanotube lengths with an average of 275 nm. The addition of enough TOAB to complex 30% of all $SO_3^-$ moieties with $TOA^+$ results in only very short nanotubes being extracted into the organic layer as seen by the AFM and corresponding histograms (FIG. 1b and FIG. 2b). As can be seen, the length distribution narrows considerably with 81% below 100 nm and an average length of 73 nm. Increased ion-pairing results in longer nanotubes being extracted. After 75% of the $SO_3^-$ moieties are ion-paired, the length distribution begins to approach that of the starting material. FIG. 3 shows the average length of the extracted nanotubes as a function of ion-pairing. It is evident that the average length increases monotonically with TOAB concentration and approaches the average length of the starting material (square symbol in figure).

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for separating SWNTs on a basis of length, said method comprising the steps of:
    a) preparing functionalized SWNTs;
        wherein the functionalized SWNTs are functionalized with ionizable functional moieties;
    b) dissolving said functionalized SWNTs in a polar solvent to form a polar phase;
    c) dissolving an amount of a phase transfer agent in a non-polar solvent to form a non-polar phase;
        wherein said amount is substoichiometric in relation to the ionizable functional moieties;
    d) combining the polar phase and the non-polar phase to form a bi-phase mixture;
    e) adding a cationic donor species to the bi-phase mixture; and
    f) agitating the bi-phase mixture;
        wherein the phase transfer agent is electrostatically coupled with at least a portion of the ionizable functional moieties within the bi-phase mixture; and
        wherein said agitating effects a preferential transport of short SWNTs into the non-polar phase to produce a non-polar phase enriched in short SWNTs and a polar phase enriched in longer SWNTs.

2. The method of claim 1, wherein the ionizable functional moieties comprise sulfonic acid groups.

3. The method of claim 2, wherein the ionizable functional moieties comprise chlorobenzenesulfonic acid groups.

4. The method of claim 1, wherein the polar solvent is water.

5. The method of claim 1, wherein the phase transfer agent is TOAB.

6. The method of claim 1, wherein the non-polar solvent is selected from the group consisting of ethyl acetate, toluene, chloroform, benzene, and combinations thereof.

7. The method of claim 1, wherein the cationic donor species is selected from the group consisting of $NH_4Cl$, $NH_4Br$, NaCl, and combinations thereof.

8. The method of claim 1, wherein the cationic donor species is electrostatically coupled with at least a portion of the ionizable functional moieties.

9. The method of claim 1, wherein the agitating step is accomplished by shaking.

10. The method of claim 1, wherein the agitating step forms an emulsion.

11. The method of claim 10, wherein the emulsion is stable.

12. The method of claim 11, further comprising the steps of:
    a) freezing the emulsion; and
    b) thawing the emulsion;
        wherein the step of freezing and the step of thawing break the emulsion.

13. The method of claim 1, further comprising separating the non-polar phase enriched in short SWNTs from the polar phase enriched in longer SWNTs.

14. The method of claim 13, further comprising filtering the non-polar phase enriched in short SWNTs to collect a short SWNT fraction.

15. The method of claim 14, further comprising repeating the steps of claim 1 on the short SWNT fraction to provide a further separation of short SWNTs on a basis of length.

16. The method of claim 13, further comprising filtering the polar phase enriched in longer SWNTs to collect a longer SWNT fraction.

17. The method of claim 16, further comprising repeating the steps of claim 1 on the longer SWNT fraction to provide a further separation of longer SWNTs on a basis of length.

18. The method of claim 12, further comprising separating the non-polar polar phase enriched in short SWNTs from the polar phase enriched in longer SWNTs.

19. The method of claim 18, further comprising filtering the non-polar phase enriched in short SWNTs to collect a short SWNT fraction.

20. The method of claim 1, further comprising adding a flocculating agent to the non-polar phase enriched in short SWNTs.

21. The method of claim 20, wherein the flocculating agent comprises acetic acid.

22. The method of claim 1, wherein the ionizable functional moieties comprise carboxylic acid-containing functional groups.

23. A method for separating CNTs on a basis of length, said method comprising the steps of:
    a) preparing functionalized CNTs;
        wherein the functionalized CNTs are functionalized with ionizable functional moieties;
    b) dissolving said functionalized CNTs in a polar solvent to form a polar phase;
    c) dissolving an amount of a phase transfer agent in a non-polar solvent to form a non-polar phase;
        wherein said amount is substoichiometric in relation to the ionizable functional moieties;
    d) combining the polar phase and the non-polar phase to form a bi-phase mixture;
    e) adding a cationic donor species to the bi-phase mixture; and
    f) agitating the bi-phase mixture;
        wherein the phase transfer agent is electrostatically coupled with at least a portion of the ionizable functional moieties within the bi-phase mixture; and
        wherein said agitating effects a preferential transport of short CNTs into the non-polar phase to produce a non-polar phase enriched in short CNTs and a polar phase enriched in longer CNTs.

24. A method for separating 1-dimensional nanostructures on a basis of length, said method comprising the steps of:
a) preparing functionalized 1-dimensional nanostructures;
   wherein the functionalized 1-dimensional nanostructures are functionalized with ionizable functional moieties;
b) dissolving said functionalized 1-dimensional nanostructures in a polar solvent to form a polar phase;
c) dissolving a substoichiometric amount of a phase transfer agent in a non-polar solvent to form a non-polar phase;
   wherein said amount is substoichiometric in relation to the ionizable functional moieties;
d) combining the polar phase and the non-polar phase to form a bi-phase mixture;
e) adding a cationic donor species to the bi-phase mixture; and
f) agitating the bi-phase mixture;
   wherein the phase transfer agent is electrostatically coupled with at least a portion of the ionizable functional moieties within the bi-phase mixture; and
   wherein said agitating effects a preferential transport of short 1-dimensional nanostructures into the non-polar phase to produce a non-polar phase enriched in short 1-dimensional nanostructures and a polar phase enriched in longer 1-dimensional nanostructures.

* * * * *